US009369425B2

(12) United States Patent
Gelfenbeyn et al.

(10) Patent No.: US 9,369,425 B2
(45) Date of Patent: Jun. 14, 2016

(54) EMAIL AND INSTANT MESSAGING AGENT FOR DIALOG SYSTEM

(71) Applicant: Speaktoit, Inc., Palo Alto, CA (US)

(72) Inventors: Ilya Gennadyevich Gelfenbeyn, Sunnyvale, CA (US); Artem Goncharuk, Arlington, VA (US); Pavel Aleksandrovich Sirotin, Sunnyvale, CA (US)

(73) Assignee: Speaktoit, Inc., Palo Alto, CA (US)

( * ) Notice: Subject to any disclaimer, the term of this patent is extended or adjusted under 35 U.S.C. 154(b) by 0 days.

(21) Appl. No.: 14/873,742

(22) Filed: Oct. 2, 2015

(65) Prior Publication Data

US 2016/0099908 A1 Apr. 7, 2016

Related U.S. Application Data

(60) Provisional application No. 62/059,185, filed on Oct. 3, 2014.

(51) Int. Cl.
*H04L 12/58* (2006.01)
*H04L 29/08* (2006.01)

(52) U.S. Cl.
CPC ............ *H04L 51/36* (2013.01); *H04L 51/00* (2013.01); *H04L 51/04* (2013.01); *H04L 51/24* (2013.01); *H04L 67/306* (2013.01)

(58) Field of Classification Search
CPC ......... H04L 51/00; H04L 51/02; H04L 51/24; H04L 51/36
See application file for complete search history.

(56) References Cited

U.S. PATENT DOCUMENTS

| | | | | |
|---|---|---|---|---|
| 6,640,230 B1* | 10/2003 | Alexander | ........... | G06Q 10/107 |
| 6,650,739 B1* | 11/2003 | Doeberl | ............ | H04M 1/72547 |
| | | | | 379/201.01 |
| 7,603,413 B1* | 10/2009 | Herold | .................. | G06Q 10/10 |
| | | | | 455/466 |
| 9,043,407 B1* | 5/2015 | Gaulke | .................. | H04L 51/02 |
| | | | | 709/206 |
| 9,240,904 B2* | 1/2016 | LaFreniere | ......... | H04L 12/5875 |
| 2001/0033298 A1* | 10/2001 | Slotznick | ............. | G06Q 10/107 |
| | | | | 715/758 |
| 2004/0230657 A1* | 11/2004 | Tomkow | ................. | H04L 51/30 |
| | | | | 709/206 |
| 2005/0041789 A1* | 2/2005 | Warren-Smith | ..... | G06Q 10/107 |
| | | | | 379/93.24 |
| 2005/0160144 A1* | 7/2005 | Bhatia | ..................... | H04L 51/12 |
| | | | | 709/206 |
| 2006/0217133 A1* | 9/2006 | Christenson | .......... | H04M 3/436 |
| | | | | 455/461 |

(Continued)

*Primary Examiner* — Lashonda Jacobs
(74) *Attorney, Agent, or Firm* — Georgiy L. Khayet

(57) ABSTRACT

Provided are methods and systems for email communication and instant messaging through a dialog system. The method may commence with enabling a user to create a personal account with a server. The personal account may be associated with the user and with the dialog system. The method may continue with enabling the user to establish a list of trusted email addresses. The method may further include receiving a notification from the server. The notification may be associated with a communication addressed to the user from one of the trusted email addresses. Upon receiving the notification, a first message associated with the notification may be delivered to the user. Upon receiving of an instruction associated with the notification from the user, an inquiry to receive the communication may be sent to the server. The method may further include delivering a second message associated with the communication to the user.

18 Claims, 6 Drawing Sheets

(56) References Cited

U.S. PATENT DOCUMENTS

| | | | |
|---|---|---|---|
| 2008/0010070 A1* | 1/2008 | Kim | G10L 13/10 704/259 |
| 2009/0024706 A1* | 1/2009 | Janakiraman | G06Q 10/107 709/206 |
| 2009/0259472 A1* | 10/2009 | Schroeter | G10L 13/043 704/260 |
| 2012/0041903 A1* | 2/2012 | Beilby | G06N 3/004 706/11 |
| 2012/0215871 A1* | 8/2012 | Zhang | G06Q 30/0269 709/206 |
| 2012/0311046 A1* | 12/2012 | Grigoriev | H04W 4/12 709/206 |
| 2014/0099922 A1* | 4/2014 | Cazanas | H04L 67/20 455/411 |
| 2014/0173003 A1* | 6/2014 | Van | H04L 67/306 709/206 |
| 2014/0207882 A1* | 7/2014 | Joo | H04L 51/04 709/206 |
| 2014/0214969 A1* | 7/2014 | Piccinini | H04L 51/02 709/206 |
| 2014/0270145 A1* | 9/2014 | Erhart | H04M 3/523 379/265.13 |
| 2014/0280623 A1* | 9/2014 | Duan | H04L 51/02 709/206 |
| 2015/0236987 A1* | 8/2015 | Hsiao | H04L 51/28 709/206 |
| 2015/0356519 A1* | 12/2015 | Wansley | G06Q 10/1097 705/7.21 |
| 2015/0381552 A1* | 12/2015 | Vijay | H04L 51/32 709/206 |

\* cited by examiner

EMAIL AND INSTANT MESSAGING AGENT FOR DIALOG SYSTEM

RELATED APPLICATIONS

The present application relies on and claims benefit of priority under 35 U.S.C. from U.S. Provisional Application Ser. No. 62/059,185, filed Oct. 3, 2014, which application is hereby incorporated by reference in its entirety.

TECHNICAL FIELD

This disclosure relates generally to data processing and, more particularly, to email and instant messaging agents for dialog systems allowing a user to receive emails or instant messages from trusted addressers with a particular dialog system notification.

BACKGROUND

Dialog systems are widely used in the information technology industry, especially as mobile applications for wireless telephones and tablet computers. Generally, a dialog system refers to a computer-based agent having a human-centric interface for accessing, processing, managing, and delivering information. The dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "dialog system" for simplicity.

Traditionally, a dialog system interacts with its users in natural language to simulate an intelligent conversation and provide personalized assistance to the users. For example, a user may generate requests to the dialog system in the form of conversational questions, such as "Where is the nearest hotel?" or "What is the weather like in Arlington?", and receive corresponding answers from the dialog system in the form of an audio and/or displayable message. The users may also provide voice commands to the dialog system so as to perform certain functions including, for example, generating emails, making phone calls, searching particular information, acquiring data, navigating, providing notifications and reminders, and so forth. Thus, dialog systems are now very popular and are of great help, especially for holders of portable electronic devices such as smart phones, cellular phones, tablet computers, gaming consoles, and the like.

One of the core features for many dialog systems is to inform the user if the user receives an email and to read the email to the user if the user requests to do so. However, it is very common for people to receive an overwhelming amount of emails every day including a great number of spam messages and advertisements. In light of this, the dialog system feature for reading emails to the users is not effective and, furthermore, it can be annoying to the users, because the users typically do not want to hear spam messages or advertisements.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for email communication and instant messaging through a dialog system. According to an aspect of the present disclosure, a system for email communication and instant messaging through a dialog system is provided. The system may include a server and a dialog system. The dialog system may at least partially operate on a user device. The dialog system may be operable to enable a user to create a personal account with the server. The personal account may be associated with the user and with the dialog system. The dialog system may further be operable to enable the user to establish a list of trusted email addresses. The server may be operable to transmit a notification to the dialog system. The notification may be associated with the communication. Additionally, the dialog system may be operable to receive the notification from the server and to deliver a first message associated with the notification to the user. The dialog system may also receive an instruction associated with the notification from the user and, based on the instruction of the user, send an inquiry to the server to receive the communication. Upon receiving of the communication from the server, the dialog system may deliver a second message associated with the communication to the user.

According to another approach of the present disclosure, there is provided a method for email communication and instant messaging through a dialog system. The method may commence with enabling a user to create a personal account with a server. The personal account may be associated with the user and with the dialog system. The method may continue with enabling the user to establish a list of trusted email addresses, from which incoming communications may be accepted. The method may further include receiving a notification from the server. The notification may be associated with a communication addressed to the user from at least one of the trusted email addresses. Upon receiving the notification, a first message associated with the notification may be delivered to the user. Upon receiving of an instruction associated with the notification from the user, an inquiry to receive the communication may be sent to the server. The method may further include delivering a second message associated with the communication to the user. The second message may include at least a portion of the communication.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Figure 1:
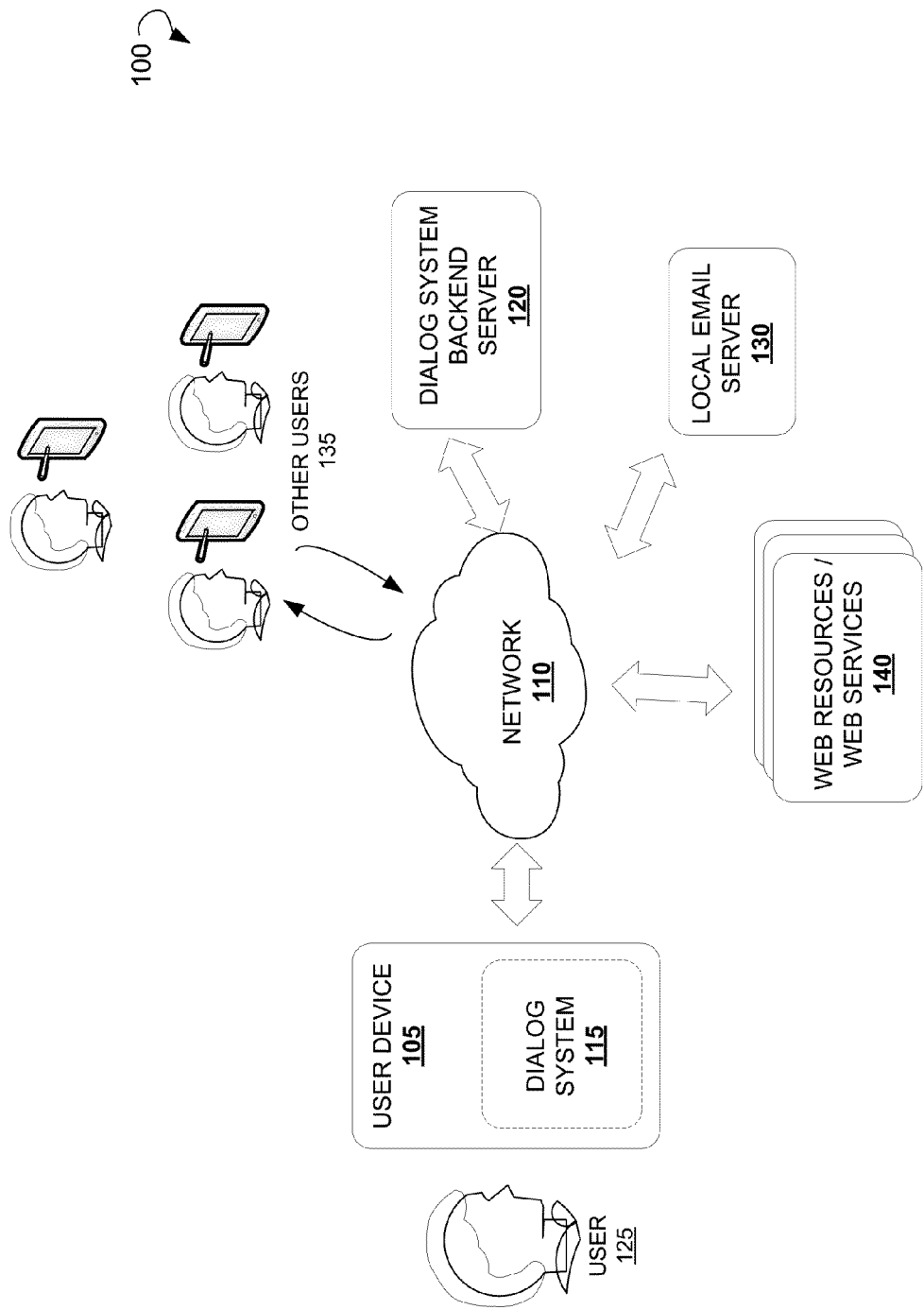
FIG. 1 illustrates a block diagram showing an environment within which methods and systems for email communication and instant messaging through a dialog system may be implemented, in accordance with an example embodiment.

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium such as a disk drive, or computer-readable medium. Methods disclosed herein can be implemented by a computer (e.g., a desktop computer, tablet computer, laptop computer), a game console, a handheld gaming device, a cellular phone, a smart phone, a smart television system, and so forth.

As outlined in the summary, the embodiments of the present disclosure refer to a method and a system for email communication and instant messaging through a dialog system. A user may interact with the dialog system utilizing a user device selected from a wide range of electronic devices including, for example, a computer (a desktop computer, a laptop computer, a tablet computer, and so forth), a smart phone, a cellular phone, a game console, a game pad, a remote controller, a television device, a smart (Internet) television device, an audio system, an in-vehicle computer system, an infotainment system, or any other suitable electronic device. The interaction with the dialog system may include speech commands, although key input commands, selection of actionable (clickable) messages, or gesture-based commands are also possible. As described below in greater detail, the dialog system may refer to a software application installed on the user device, a server, or a remote device, or it may refer to a distributed application or a cloud-based service.

The dialog system of the present disclosure may have an email and/or instant messaging agent enabled to read only emails or instant messages received from trusted email addresses. More specifically, the user may create a personal account with a server. The personal account may relate to email communications or instant messaging. The user may create a list of trusted email addresses, from which incoming emails may be accepted by the email agent. Furthermore, the user may create a list of trusted user identifiers so that the instant messaging agent may accept only instant messages associated with the trusted user identifiers. The list of trusted email addresses and the list of trusted user identifiers may be stored on the server associated with the personal account of the user. The server may include, for example, an email server associated with an email box of the user or a server associated with an instant messenger that is installed on the user device.

The server may receive a communication, such as an email or an instant message, addressed to the user. The server may determine that the communication is received from one of the trusted email addresses. The server may send a notification informing about the communication to the dialog system. The dialog system may receive the notification and display a message informing about the notification to the user. The user may read the message and provide an instruction to receive the communication. The dialog system may request the server to send the notification to the dialog system. In response to such request, the server may send the communication to the dialog system. Upon receiving the communication, the dialog system may display the communication to the user.

If the user does not want to receive the notification, the user may give a command to decline receiving the communication. In case of receiving such instruction, the dialog system may not send any requests relating to the communication to the server. In absence of the request, the server may not send the communication to the dialog system.

FIG. 1 shows a high-level diagram of an environment 100 within which methods and systems for email communication and instant messaging through a dialog system may be implemented, in accordance with an example embodiment. In some example embodiments, the environment 100 refers to a distributed system environment or "cloud-based" system environment. In this example, there is provided a user device 105, which refers to a smart phone, a wireless telephone, and/or a computer, such as a tablet computer, a desktop computer, a laptop computer, an infotainment system, an in-vehicle computing device, and the like. The user device 105 includes a dialog system 115, which is implemented at least partially as a software application or, more specifically, a mobile application. In some embodiments, the dialog system 115 may relate to a distributed application meaning that some functions (such as recording of user inputs and delivering audio outputs) are implemented by the user device 105, while some other functions (such as voice recognition and generating a response) are performed on a server side. However, in other embodiments, the entire functionality of the dialog system 115 can be implemented within the user device 105.

As shown in the example of FIG. 1, the user device 105 can be in communication with a dialog system backend server 120, a local email server 130, and other web resources 140, such as other email servers, web sites, web services, and the like. The communication may be performed via a network 110.

The network 110 can be a wireless or wire network, or a combination thereof. The network 110 may include the Internet or any other network capable of communicating data between devices. Suitable networks may include or interface with any one or more of, for instance, a local intranet, a personal area network, a local area network, a wide area network, a metropolitan area network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a fiber channel connection, an infrared port, a Small Computer Systems Interface connection, a Universal Serial Bus connection or other wired or wireless, digital or analog interface or connection, mesh or Digi® networking. The network 110 may include a network of data processing nodes that are interconnected for the purpose of data communication.

A user 125 may interact with the dialog system 115 by providing a user input using the user device 105. The user input may be in the form of a typed text, a gesture, a speech (audio), and so forth. A plurality of other users 135 may be connected to the network 110. The user 125 may select a list of trusted users from the plurality of other users 135. The list of trusted users may include a list of trusted email addresses associated with the plurality of other users 135.

Figure 2:
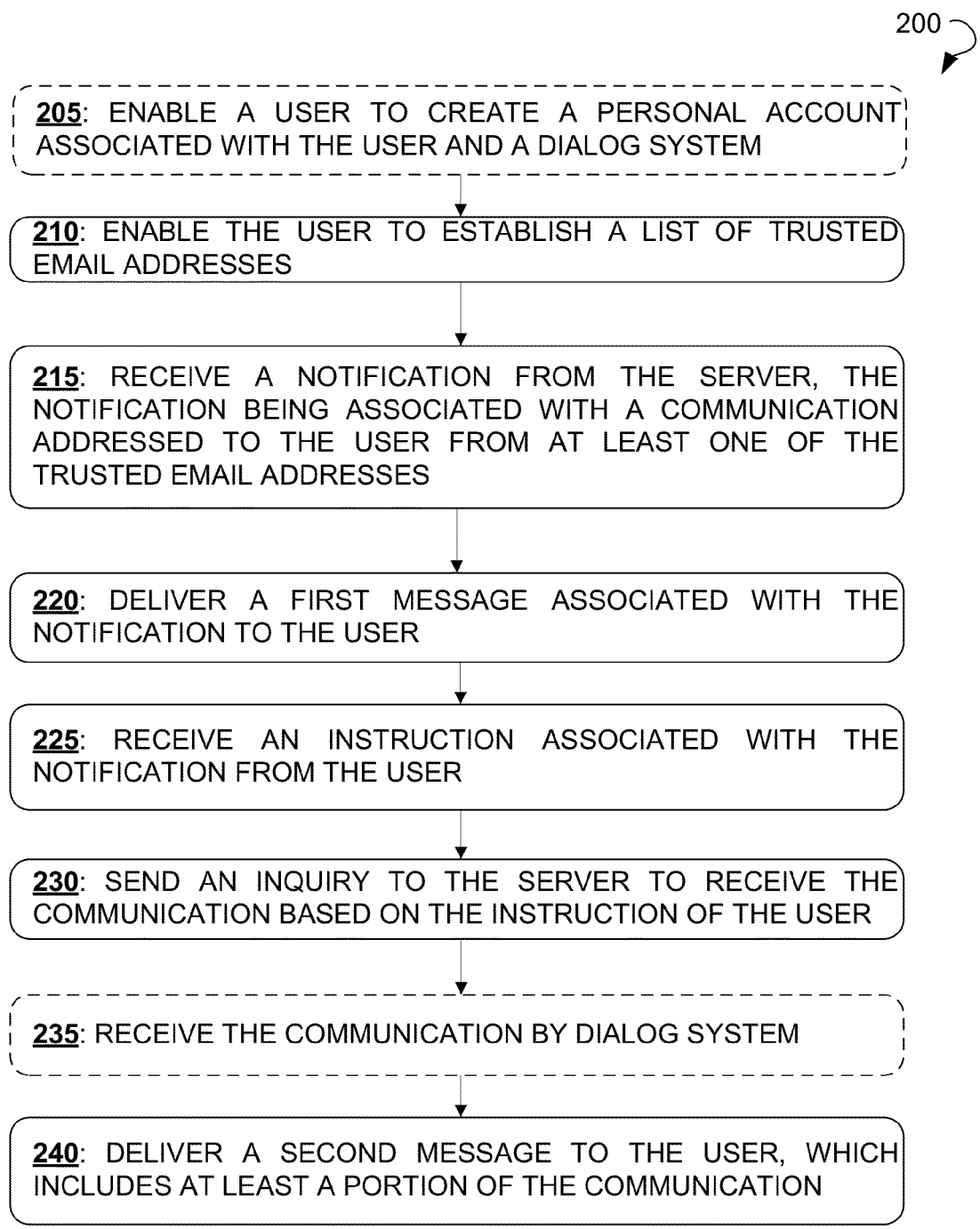
FIG. 2 illustrates a flow chart showing a method for email communication and instant messaging through a dialog system, in accordance with an example embodiment.

FIG. 2 is a process flow diagram showing a method 200 for email communication and instant messaging through a dialog system, according to an example embodiment. The method 200 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the dialog system and/or a dialog system backend server.

The below recited operations of method 200 may be implemented in an order different than described and shown in FIG. 2. Moreover, the method 200 may have additional operations not shown herein, but which can be evident for those skilled in the art from the present disclosure. The method 200 may also have fewer operations than outlined below and shown in FIG. 2.

At operation 205, the dialog system may optionally enable the user to create a personal account with a server. The personal account may be associated with the user and the dialog system. In an example embodiment, the personal account may include a personal email account or a personal instant messaging account of the user. For example, the user may access a graphical interface of the dialog system using the user device and click "Assistant Email" button in a settings menu. Then, the user may be prompted to create a personal email name (i.e., a login) and optionally provide additional information, such as a password, a general email address handled by another email server (e.g., Gmail), notification settings, and so forth. The same or similar procedure can be completed through a website associated with the dialog system backend server.

Once all required information is provided by the user, a local email server may create a personal account for the user (for example, a personal email account name@pa.ai). The personal account may be associated not only with the user, but with the dialog system at least partially operating on the user device and a general email account of the user (for example, name@gmail.com). In an example embodiment, when the personal email account is created, the user may receive a welcome email having, for example, the following content: "Here is your personal assistant's email. If someone emails to this address, the message will be forwarded to your main address and you can store it in a separate folder. If someone from a priority list emails your assistant, the message will be delivered to you immediately and you will be able to answer immediately."

At operation 210, the user may be enabled and prompted to establish a list of trusted email addresses. Optionally, all email addresses can be allowed. The trusted email addresses may relate to members of the general public that the user designates as being important to the user. For example, such members of the general public can include family members, friends, colleagues, and so forth. In an example embodiment, the trusted email addresses may be associated with members of the general public different from the user. The list of trusted email addresses can be created when the user enters or selects the emails or names from a contact list of the user stored on the user device or other web resources. In an example embodiment, once the trusted email addresses are selected, the dialog system can email to these trusted email addresses to inform that the user selected them as trusted email addresses and invite these people to install the dialog system on their user devices if they have not done so.

The server, for example the local email server, may receive, at the personal account that the user has created, a communication addressed to the user. For example, the communication can be address to name@pa.ai. In an example embodiment, the communication may include an email communication or an instant message. The server, e.g., the local email server and/or dialog system backend server, may identify that the communication is received from at least one of the trusted email addresses.

When the email communication is received from at least one of the trusted email addresses, the local email server and/or dialog system backend server transmits a notification to the dialog system to inform about the email communication. Otherwise, if the email communication is received from a non-trusted address, the email communication is just kept stored on the local email server. In an example embodiment, the notification may include metadata of the email communication received by the server and addressed to the user or metadata of the instant message received by the server and addressed to the user.

At operation 215, the dialog system may receive the notification from the server, such as the local email server. At operation 220, the dialog system may deliver a first message associated with the notification to the user. In an example embodiment, the first message includes one or more of the following: a first displayable message and a first audio message. For example, the first displayable message and/or a first audio message may have the form of a push notification, although any suitable multimedia content is available for the notifying. Optionally, the first displayable message and/or the first audio message can be associated with text and/or a summary of the communication. In this case, there is no need to perform another query to the server to obtain contents of the communication. In an example embodiment, the delivering of the first message may include displaying of the first message on a display of the user device and/or audio reproducing of the first message by an audio reproducing unit of the user device.

Upon delivering the first message to the user, the dialog system may receive an instruction from the user at operation 225. The instruction may be associated with the notification. More specifically, the instruction includes one or more of the following: an instruction to obtain the communication, an instruction to read the communication, an instruction to display the communication, and so forth. The instruction can refer to an oral input or an input made with the use of a keypad or touchscreen of the user device.

At operation 230, based on the instruction of the user, the dialog system may send an inquiry to the server, such as the local email server and/or dialog system backend server, to receive the communication.

The server may transmit the communication to the dialog system in response to the inquiry. At operation 235, the dialog system may receive the communication from the server. At operation 240, the dialog system may deliver a second message to the user. The second message may include at least a portion of the communication. In an example embodiment, the second message includes one or more of the following: a second displayable message and a second audio message. In a further example embodiment, the delivering of the second message may include displaying of the second message on a display of the user device and/or audio reproducing of the second message by an audio reproducing unit of the user device.

The user can later be prompted to generate a response to the communication using the dialog system. The response can be given by the user in the oral form, and the dialog system may recognize the text and instructions so as to construe and send a reply email or a reply instant message.

In addition, the dialog system may also suggest that the user creates one or more events in a virtual calendar based upon the communication received or at least one portion of it. Alternatively, the dialog system may automatically create one or more events in a virtual calendar based on internal system logic and/or user preferences. If the user wants to create an event in the virtual calendar, the dialog system may create the event based on an oral instruction of the user or automatically without requiring user approval. The dialog system may also check if there is a conflict (such as a same time and a same venue) with other scheduled events in the virtual calendar, and if there are conflicts, the dialog system may suggest one or more alternatives. For example, the dialog system may selectively change the one or more events in the virtual calendar based on the instruction of the user, the internal system logic, or the user preferences. The dialog system may suggest a new time or venue, and if the user agrees or, automatically, without user approval, the dialog system may send a reply email communication with new proposed time or venue.

As mentioned with regard to FIG. 2, the operations of the method 200 are suitable both for email communication and for instant messaging. Accordingly, all of the above recited operations may be implemented both with respect to the email communication and the instant message. In this regard, instead of the local email server, an instant messaging server or similar backend system can be used that can trigger notifications to the user.

Figure 3:
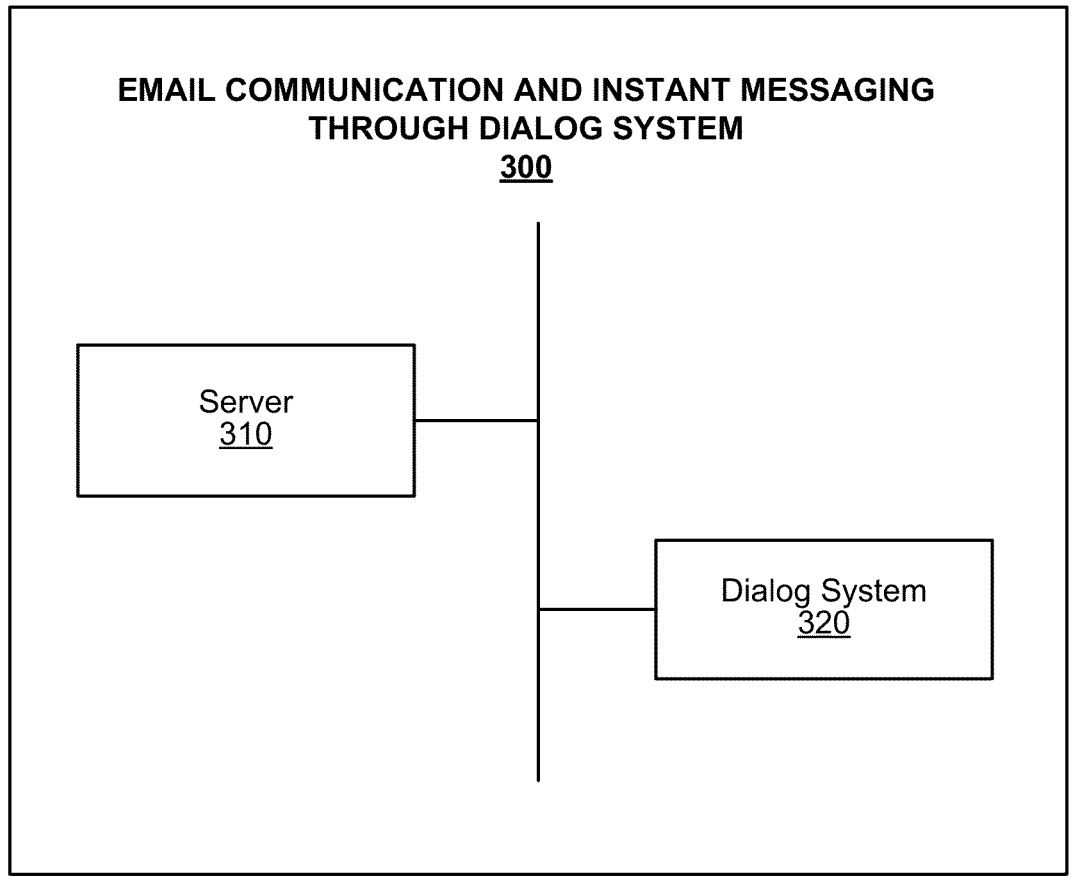
FIG. 3 illustrates a block diagram illustrating an example system for email communication and instant messaging through a dialog system, in accordance with an example embodiment.

FIG. 3 illustrates a block diagram showing a system 300 for email communication and instant messaging through a dialog system, in accordance with an example embodiment. The system 300 may include a server 310 and a dialog system 320.

In an example embodiment, the server 310 may include a local email server, an instant messaging server, a dialog system backend server, and so forth. The dialog system 320 may at least partially operate on a user device.

The dialog system 320 may be operable to enable a user to create a personal account with the server 310. The personal account may be associated with the user and with the dialog system. The personal account may include a personal email account or a personal instant messaging account. The dialog system 320 may further enable the user to establish a list of trusted email addresses.

The server 310 may be operable to receive a communication addressed to the user. In an example embodiment, the communication may include an email communication or an instant message. The server 310 may identify that the communication is received from at least one of the trusted email addresses. Based on the identification, the server 310 may create the notification associated with the communication. The server 310 may further transmit a notification to the dialog system 320. In an example embodiment, the notification may include metadata of the email communication received by the server 310 and addressed to the user. In a further example embodiment, the notification may include metadata of the instant message received by the server 310 and addressed to the user.

The dialog system 320 may receive the notification from the server 310. Upon receiving the notification, the dialog system 320 may deliver a first message associated with the notification to the user. In an example embodiment, the first message may include a first displayable message and/or a first audio message. The first message may be delivered by displaying of the first message on a display of the user device and by audio reproducing of the first message by an audio reproducing unit of the user device.

Upon delivering the first message to the user, the dialog system 320 may receive an instruction associated with the notification from the user. The instruction may include one or more of the following: an instruction to obtain the communication, an instruction to read the communication, an instruction to display the communication, and so forth. Based on the instruction of the user, the dialog system 320 may send an inquiry to the server 310 to receive the communication.

The server 310 may receive the inquiry associated with the notification from the dialog system 320. Based on the inquiry, the server 310 may transmit the communication to the dialog system 320.

The dialog system 320 may receive the communication from the server 310. The dialog system 320 may further deliver a second message associated with the communication to the user. The second message may include at least a portion of the communication. In an example embodiment, the second message may include a second displayable message and/or a second audio message. The second message may be delivered by displaying the second message on a display of the user device or by audio reproducing the second message by an audio reproducing unit of the user device.

Figure 4:
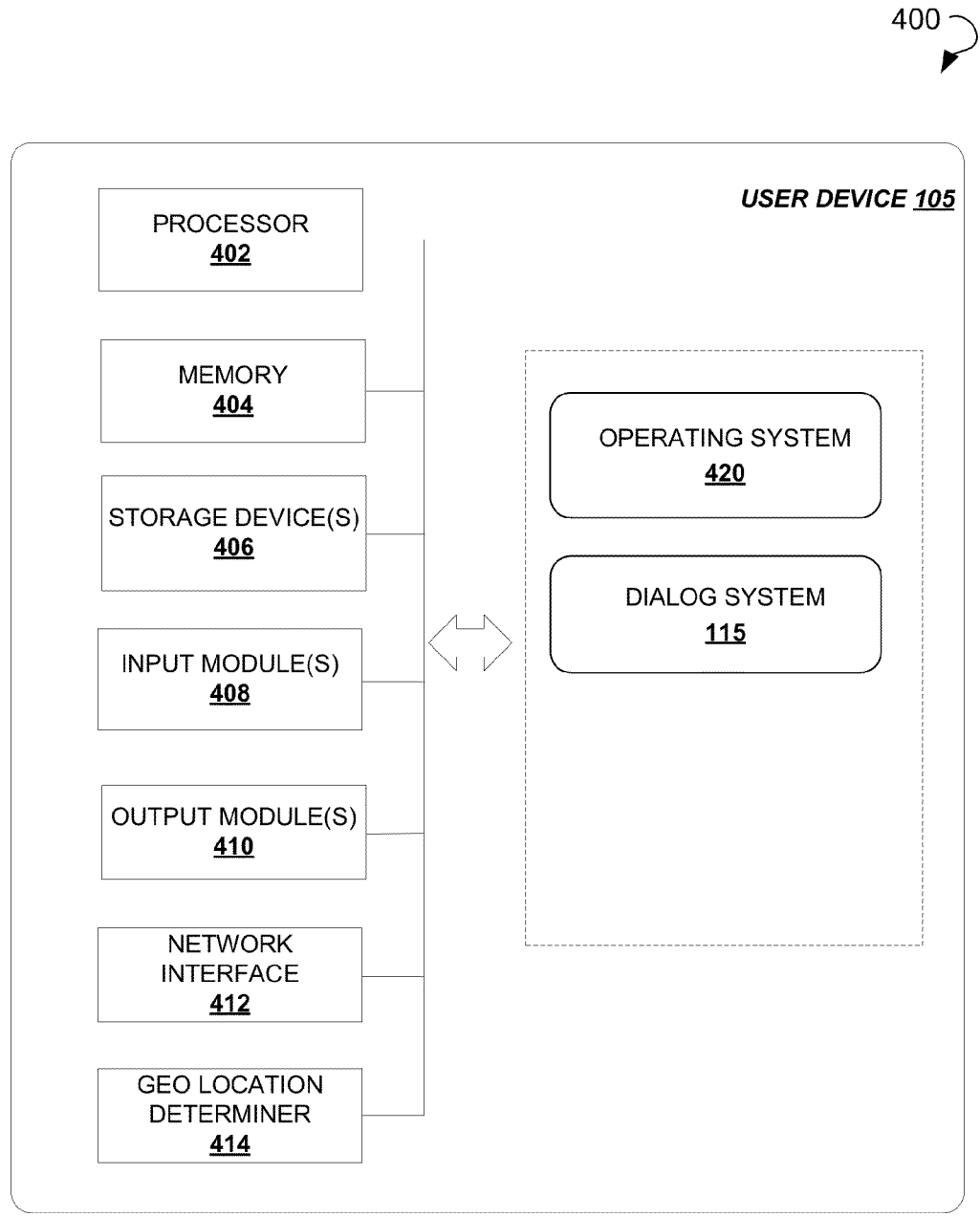
FIG. 4 is a high-level block diagram illustrating a user device suitable for implementing a method for email communication and instant messaging through a dialog system, in accordance with an example embodiment.

FIG. 4 is a high-level block diagram 400 illustrating a user device 105 suitable for implementing the methods described herein. All components of the user device 105 may include logic elements, hardware components, software (firmware) components, virtual components, or a combination thereof. The user device 105 may include, be, or be an integral part of one or more of a variety of types of devices and systems such as a general-purpose computer, desktop computer, server, computer network, network service, cloud computing service, among others. Further, all modules shown in FIG. 4 may be operatively coupled using any suitable wired, wireless, radio, electrical, or optical standards. As already outlined above, the user device 105 may refer to a smart phone, a wireless telephone, a computer, such as a tablet computer, a desktop computer, an infotainment system, an in-vehicle computing device, and so forth.

As shown in FIG. 4, the user device 105 includes the following hardware components: a processor 402, memory 404, one or more storage devices 406, one or more input modules 408, one or more output modules 410, network interface 412, and optional geo location determiner 414. The user device 105 also includes the following software or virtual components: an operating system 420, dialog system 115, rules database (not shown), and user profile/settings database (not shown). The dialog system 115 provides a human-centric interface for accessing and managing information as discussed herein.

The processor 402 may be, in some embodiments, configured to implement functionality and/or process instructions for execution within the user device 105. For example, the processor 402 may process instructions stored in memory 404 and/or instructions stored on storage devices 406. Such instructions may include components of the operating system 420 and dialog system 115. The user device 105 may also include one or more additional components not shown in FIG. 4, such as a housing, a power supply, a communication bus, and so forth. These elements are not shown on FIG. 4 so as to not burden the description of the present embodiments.

Memory 404, according to one example embodiment, is configured to store information within the user device 105 during operation of the user device 105. Memory 404, in some example embodiments, may refer to a non-transitory computer-readable storage medium or a computer-readable storage device. In some examples, memory 404 is a temporary memory, meaning that a primary purpose of memory 404 may not be long-term storage. Memory 404 may also refer to a volatile memory, meaning that memory 404 does not maintain stored contents when memory 404 is not receiving power. Examples of volatile memories include random access memories, dynamic random access memories, static random access memories, and other forms of volatile memories known in the art. In some examples, memory 404 is used to store program instructions for execution by the processors 402. Memory 404, in one example embodiment, is used by software (e.g., the operating system 420) or dialog system 115 executing on user device 105 to temporarily store information during program execution. One or more storage devices 406 can also include one or more transitory or non-transitory computer-readable storage media and/or computer-readable storage devices. In some embodiments, storage devices 406 may be configured to store greater amounts of information than memory 404. Storage devices 406 may further be configured for long-term storage of information. In some examples, the storage devices 406 include non-volatile storage elements. Examples of such non-volatile storage elements include magnetic hard discs, optical discs, solid-state discs, flash memories, forms of electrically programmable memories or electrically erasable and programmable memories, and other forms of non-volatile memories known in the art.

Still referencing to FIG. 4, the user device 105 may include one or more input modules 408. The input modules 408 may be configured to receive user inputs. Examples of input modules 408 include a microphone, keyboard, keypad, mouse, trackball, touchscreen, touchpad, or any other device capable of detecting an input from a user or other source in the form of speech, audio, or tactile actions, and relaying the input to the user device 105 or components thereof. The output modules 410, in some example embodiments, are configured to provide output to users through visual or auditory channels. Output modules 410 may include a video graphics adapter card, a liquid crystal display monitor, a light emitting diode monitor, sound card, speaker, or any other device capable of generating output that may be intelligible to a user.

The user device 105, in certain example embodiments, includes network interface 412. The network interface 412 can be utilized to communicate with external devices, servers, networked systems via one or more communications networks such as one or more wired, wireless, or optical networks including, for example, the Internet, intranet, local area network, wide area network, cellular phone networks (e.g. Global System for Mobile communications network, packet switching communications network, circuit switching communications network), Bluetooth radio, and an IEEE 802.11-based radio frequency network, among others. The network interface 412 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus.

The user device 105 may further include a geo location determiner 414 for determining a current geographical location of the user device. The geo location determiner 414 may utilize a number of different methods for determining geographical location including, for example, receiving and processing signals of Global Positioning Systems, GLONASS satellite navigation systems, or Galileo satellite navigation system; utilizing multilateration of radio signals between radio towers (base stations); or utilizing geolocation methods associated with Internet Protocol addresses, Media Access Control addresses, Radio-Frequency Identification, or other technologies.

The operating system 420 may control one or more functionalities of user device 105 or components thereof. For example, the operating system 420 may interact with the dialog system 115, and may further facilitate one or more interactions between processor 402, memory 404, storage devices 406, input modules 408, and output modules 410. As shown in FIG. 4, the operating system 420 may interact with or be otherwise coupled to the dialog system 115 and components thereof. In some embodiments, the dialog system 115 can be included in the operating system 420. The user device 105 and its components, such as the dialog system 115, may also interact with one or more remote storage or computing resources including, for example, web resources, websites, social networking websites, blogging websites, news feeds, email servers, web calendars, event databases, ticket aggregators, map databases, points of interest databases, and so forth.

Figure 5:
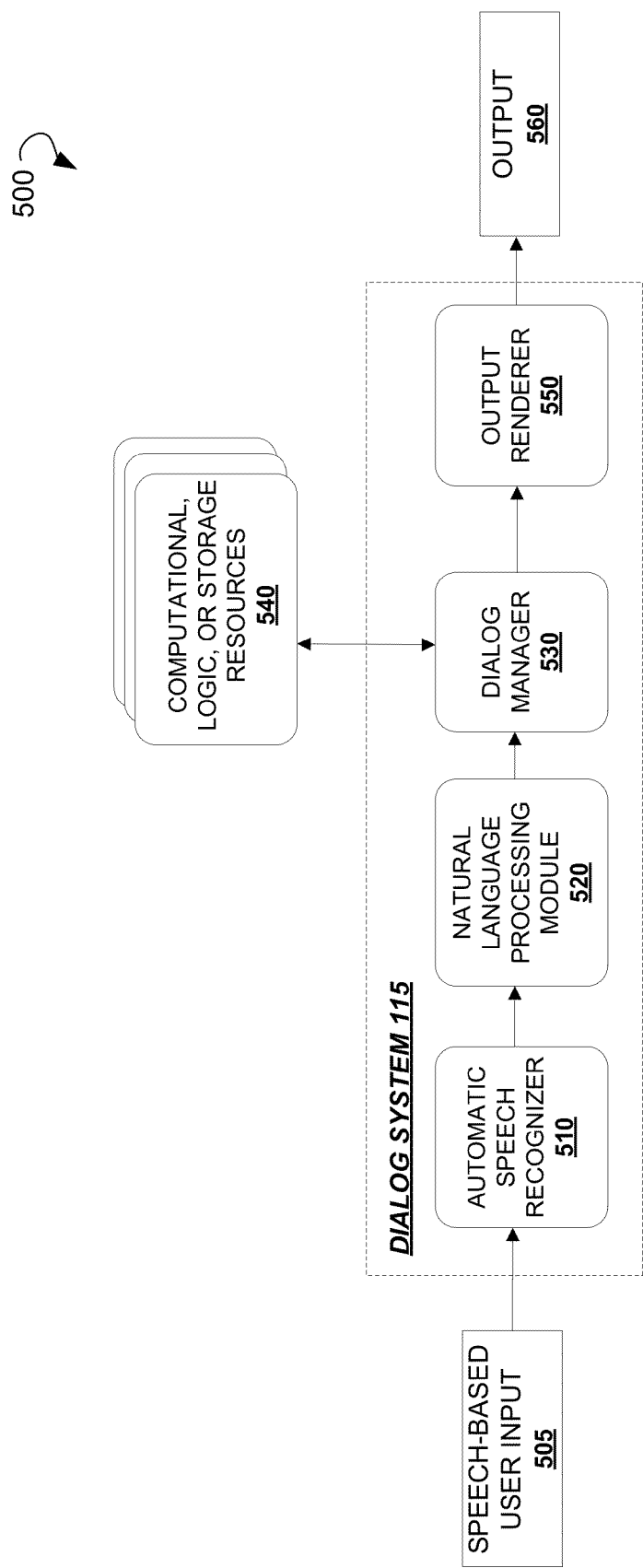
FIG. 5 shows a high level architecture of a dialog system, according to an example embodiment

FIG. 5 shows a high-level architecture 500 of a dialog system 115, according to an example embodiment. Every module of the dialog system 115 or associated architecture includes hardware components, software components, or a combination thereof. The dialog system 115 may be embedded or installed in the user device or server, or may be presented as a cloud computing module and/or a distributed computing module.

In the shown embodiment, the dialog system 115 may include an automatic speech recognizer (ASR) 510 configured to receive and process speech-based user inputs, such as a speech-based user input 505, into a sequence of parameter vectors. The ASR 510 may further convert the sequence of parameter vectors into a recognized input (i.e., a textual input having one or more words, phrases, or sentences). The ASR 510 includes one or more speech recognizers such as a pattern-based speech recognizer, free-dictation recognizer, address book based recognizer, dynamically created recognizer, and so forth.

Further, the dialog system 115 may include a natural language processing (NLP) module 520 for understanding spoken language input. Specifically, the NLP module 520 may disassemble and parse the recognized input to produce utterances, which are then analyzed utilizing, for example, morphological analysis, part-of-speech tagging, shallow parsing, and the like, and then map recognized input or its parts to meaning representations.

The dialog system 115 may further include a dialog manager 530, which coordinates the activity of all components, controls dialog flows, and communicates with external applications, devices, services or resources. The dialog manager 530 may play many roles, which include discourse analysis, knowledge database query, and system action prediction based on the discourse context. In some embodiments, the dialog manager 530 may contact one or more task managers (not shown) that may have knowledge of specific task domains. In some embodiments, the dialog manager 530 may communicate with various computational, logic, or storage resources 540, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. The dialog manager 530 may employ multiple disparate approaches to generate outputs in response to recognized inputs. Some approaches include the use of statistical analysis, machine-learning algorithms (e.g., neural networks), heuristic analysis, and so forth. The dialog manager 530 is one of the central components of dialog system 115. The major role of the dialog manager 530 is to select the correct system actions based on observed evidences and inferred dialog states from the results of NLP (e.g., dialog act, user goal, and discourse history). In addition, the dialog manager 530 may be able to handle errors when the user input has ASR and NLP errors caused by noises or unexpected inputs.

The dialog system 115 may further include an output renderer 550 for transforming the output 560 of the dialog manager 530 into a form suitable for providing to the user. For example, the output renderer 550 may employ a text-to-speech engine or may contact a pre-recorded audio database to generate an audio message corresponding to the output 560 of the dialog manager 530. In certain embodiments, the output renderer 550 may present the output 560 of the dialog manager 530 as a text message, an image, an audio, a displayable message, or a video message for further displaying on a display screen of the user device.

Figure 6:
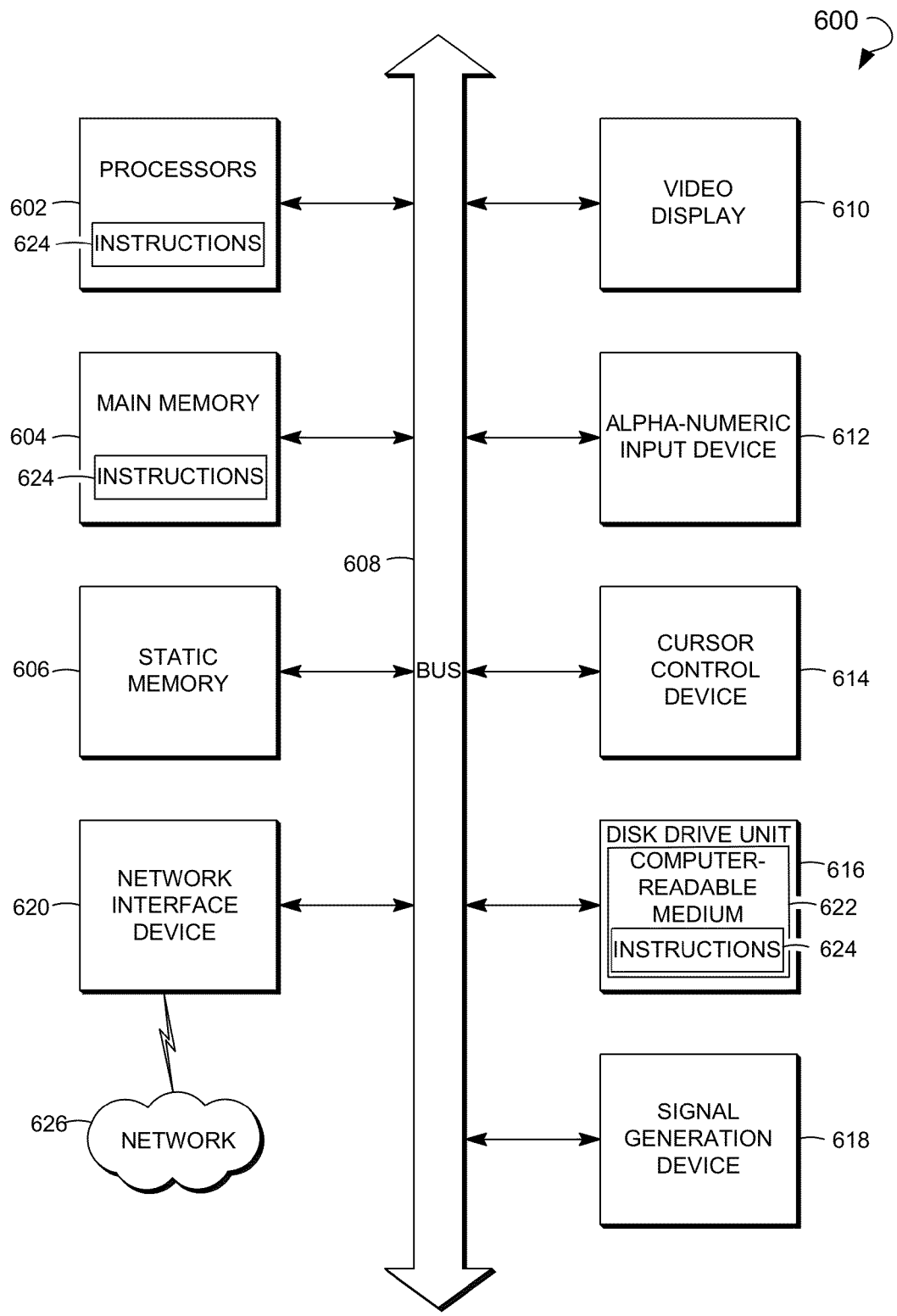
FIG. 6 illustrates a diagrammatic representation of an example machine in the form of a computer system within which a set of instructions for causing the machine to perform any one or more of the methodologies discussed herein is executed.

FIG. 6 illustrates a diagrammatic representation of an example machine in the form of a computer system within which a set of instructions for causing the machine to perform any one or more of the methodologies discussed herein is executed. A computer system 600 may include a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box, a tablet computer, a cellular telephone, a smartphone, a portable music player (e.g., a portable hard drive audio device such as a Moving Picture Experts Group Audio Layer 3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit, a graphics processing unit, or both), a main memory 604, and a static memory 606, which communicate with each other via a bus 608. The computer system 600 may further include a video display unit 610 (e.g., a liquid crystal display or a cathode ray tube). The computer system 600 may also include an alphanumeric input device 612 (e.g., a keyboard), a cursor control device 614 (e.g., a mouse), a disk drive unit 616, a signal generation device 618 (e.g., a speaker), and a network interface device 620.

The disk drive unit 616 includes a computer-readable medium 622, on which is stored one or more sets of instructions and data structures (e.g., instructions 624) embodying or utilized by any one or more of the methodologies or functions described herein. The instructions 624 may also reside, completely or at least partially, within the main memory 604 and/or within the processors 602 during execution thereof by the computer system 600. The main memory 604 and the processors 602 may also constitute machine-readable media.

The instructions 624 may further be transmitted or received over a network 626 via the network interface device 620 utilizing any one of a number of well-known transfer protocols (e.g., Hyper Text Transfer Protocol).

While the computer-readable medium 622 is shown in an example embodiment to be a single medium, the term "computer-readable medium" includes a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory, read only memory, and the like. The example embodiments described herein may be implemented in an operating environment comprising software installed on a computer, in hardware, or in a combination of software and hardware.

Thus, methods and systems for email communication and instant messaging through a dialog system are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The invention claimed is:

1. A system for email communication and instant messaging through a dialog system, the system comprising:
a server operable to:
transmit a notification to the dialog system, wherein the notification is associated with a communication addressed to a user; and
the dialog system operable to:
enable the user to establish a list of trusted email addresses;
receive the notification from the server, wherein the communication includes an email communication or an instant message;
deliver a first message associated with the notification to the user;
receive an instruction associated with the notification from the user;
based on the instruction of the user, send an inquiry to the server to receive the communication;
in response to the inquiry, receive, by a user device, the communication, wherein the receiving of the communication includes delivering the email communication or the instant message from the server to the user device; and
deliver a second message associated with the communication to the user by the dialog system, the second message including at least a portion of the email communication or at least a portion of the instant message.

2. The system of claim 1, wherein the server is further operable to:
receive the communication addressed to the user;
identify that the communication is received from at least one of the trusted email addresses;
based on the identification, create the notification;
receive the inquiry associated with the notification from the dialog system; and
based on the inquiry, transmit the communication to the dialog system.

3. The system of claim 1, wherein the notification includes one of the following: metadata of the email communication received by the server and addressed to the user and metadata of the instant message received by the server and addressed to the user.

4. The system of claim 1, wherein the dialog system is further operable to:
create one or more events in a virtual calendar, wherein the one or more events are created based on one or more of the following: the communication, the instruction of the user, an internal system logic, and user preferences.

5. The system of claim 4, wherein the dialog system is further operable to:
check for a conflict of the one or more events with events stored in the virtual calendar, wherein the conflict includes one or more of the following: a same time and a same venue; and
selectively change the one or more events in the virtual calendar, wherein the changing is based on one or more of the following: the instruction of the user, the internal system logic, and the user preferences.

6. The system of claim 1, wherein the first message includes one or more of the following: a first displayable message and a first audio message; and
wherein the second message includes one or more of the following: a second displayable message and a second audio message.

7. The system of claim 1, wherein the dialog system is further operable to:
enable the user to create a personal account with the server, wherein the personal account is associated with the user and with the dialog system, wherein the dialog system is at least partially operating on a user device.

8. The system of claim 7, wherein the personal account includes one of the following:
a personal email account and a personal instant messaging account.

9. The system of claim 7, wherein the delivering of the first message includes one or more of the following: displaying of the first message on a display of the user device and audio reproducing of the first message by an audio reproducing unit of the user device; and
wherein the delivering of the second message includes one or more of the following: displaying of the second message on a display of the user device and audio reproducing of the second message by an audio reproducing unit of the user device.

10. A method for email communication and instant messaging through a dialog system, the method comprising:
enabling a user to establish a list of trusted email addresses;
receiving a notification from a server, the notification being associated with a communication addressed to the user from at least one of the trusted email addresses, wherein the communication includes an email communication or an instant message;
delivering a first message associated with the notification to the user;
receiving an instruction from the user, the instruction being associated with the notification;
based on the instruction of the user, sending an inquiry to the server to receive the communication;
in response to the inquiry, receiving, by a user device, the communication, wherein the receiving of the communication includes delivering the email communication or the instant message from the server to the user device; and
delivering a second message associated with the communication to the user by the dialog system, the second message including at least a portion of the email communication or at least a portion of the instant message.

11. The method of claim 10, wherein the notification includes one of the following: metadata of the email communication received by the server and addressed to the user and metadata of the instant message received by the server and addressed to the user.

12. The method of claim 10, wherein each of the trusted email addresses relates to members of public different from the user.

13. The method of claim 10, further comprising enabling the user to create a personal account with the server, wherein the personal account is associated with the user and with the dialog system, wherein the dialog system is at least partially operating on a user device.

14. The method of claim 13, wherein the personal account includes one of the following: a personal email account and a personal instant messaging account.

15. The method of claim 13, wherein the delivering of the first message includes one or more of the following: displaying of the first message on a display of the user device and audio reproducing of the first message by an audio reproducing unit of the user device; and
wherein the delivering of the second message includes one or more of the following: displaying of the second message on a display of the user device and audio reproducing of the second message by an audio reproducing unit of the user device.

16. The method of claim 10, wherein the instruction includes one or more of the following: an instruction to obtain the communication, an instruction to read the communication, and an instruction to display the communication.

17. The method of claim 10, further comprising receiving the communication from the server.

18. A system for email communication and instant messaging through a dialog system, the system comprising:
- a server operable to:
  - receive a communication addressed to a user;
  - identify that the communication is received from at least one of a plurality of trusted email addresses;
  - based on the identification, transmit a notification to the dialog system, wherein the notification is associated with the communication;
  - receive an inquiry associated with the notification from the dialog system; and
  - based on the inquiry, transmit the communication to the dialog system; and
- the dialog system operable to:
  - enable the user to create a personal account with the server, wherein the personal account is associated with the user and with the dialog system, wherein the dialog system is at least partially operating on a user device;
  - enable the user to establish a list of the trusted email addresses, wherein each of the trusted email addresses relates to members of public different from the user;
  - receive the notification from the server, wherein the communication includes an email communication or an instant message;
  - deliver a first message associated with the notification to the user;
  - receive an instruction associated with the notification from the user;
  - based on the instruction of the user, send an inquiry to the server to receive the communication;
  - in response to the inquiry, receive, by a user device, the communication from the server, wherein the receiving of the communication includes delivering the email communication or the instant message from the server to the user device; and
  - deliver a second message associated with the communication to the user by the dialog system, the second message including at least a portion of the email communication or at least a portion of the instant message.

* * * * *